United States Patent
Luo (10) Patent No.: US 11,144,725 B2
(45) Date of Patent: Oct. 12, 2021

(54) PREDICTIVE NATURAL LANGUAGE RULE GENERATION

(71) Applicant: International Business Machines Corporation, Armonk, NY (US)

(72) Inventor: Yan Luo, Concord (CA)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 16/352,897

(22) Filed: Mar. 14, 2019

(65) Prior Publication Data

US 2020/0293617 A1    Sep. 17, 2020

(51) Int. Cl.
*G06F 40/30* (2020.01)
*G06N 3/04* (2006.01)
*G06N 3/08* (2006.01)

(52) U.S. Cl.
CPC .......... *G06F 40/30* (2020.01); *G06N 3/0445* (2013.01); *G06N 3/08* (2013.01)

(58) Field of Classification Search
CPC .... G06F 40/211; G06F 40/253; G06F 40/268; G06F 40/284; G06F 40/30; G06F 40/279; G06N 20/00
See application file for complete search history.

(56) References Cited

U.S. PATENT DOCUMENTS

| | | | | |
|---|---|---|---|---|
| 7,869,989 B1 * | 1/2011 | Harvey | ................. | G06F 40/242 704/9 |
| 8,880,999 B1 * | 11/2014 | Hsu | ...................... | G06F 40/166 715/234 |
| 9,619,209 B1 * | 4/2017 | Allen | ..................... | G06F 40/117 |
| 10,032,046 B1 * | 7/2018 | Hayashi | .............. | H04L 63/0245 |
| 10,515,212 B1 * | 12/2019 | McClintock | .......... | G06F 21/562 |
| 10,664,472 B2 * | 5/2020 | Burceanu | ................ | G06F 40/51 |
| 2004/0006558 A1 * | 1/2004 | Dehlinger | .............. | G06F 16/35 |
| 2005/0120011 A1 * | 6/2005 | Dehlinger | ............. | G06F 40/205 |
| 2012/0192151 A1 * | 7/2012 | Parkes | ...................... | G06F 8/34 717/120 |
| 2014/0013299 A1 * | 1/2014 | Bordeaux | ................ | G06F 8/30 717/106 |
| 2016/0202971 A1 | 7/2016 | Frenkiel | | |
| 2017/0004120 A1 * | 1/2017 | Eck | ....................... | G06F 40/289 |
| 2017/0039188 A1 * | 2/2017 | Allen | ....................... | G06F 8/73 |

(Continued)

OTHER PUBLICATIONS

Hu et al., Summarizing source code with transferred API Knowledge, 2018, (IJCAI 2018), Jul. 13-19, pp. 1-9 (Year: 2018).*

(Continued)

*Primary Examiner* — Lamont M Spooner
(74) *Attorney, Agent, or Firm* — Randy E. Tejeda (57) ABSTRACT

In an approach to generating natural language rules based on detected code snippets, one or more computer processors detect a code snippet. The one or more computer processors extract code information from the detected code snippet. The one or more computer processors feed the extracted code information into a cognitive model, wherein the cognitive model utilizes one or more historical code snippets based on the extracted code information and one or more natural language rules based on the extracted code information. The one or more computer processors generate, based on one or more calculations by the cognitive model, a natural language rule for the code snippet.

20 Claims, 4 Drawing Sheets

(56) References Cited

U.S. PATENT DOCUMENTS

| | | | |
|---|---|---|---|
| 2017/0052766 A1* | 2/2017 | Garipov | G06F 16/2291 |
| 2017/0169813 A1* | 6/2017 | Suzuki | G10L 15/01 |
| 2017/0192777 A1* | 7/2017 | Apte | G06F 8/427 |
| 2017/0193437 A1* | 7/2017 | Apte | G06F 8/51 |
| 2017/0212829 A1 | 7/2017 | Bales | |
| 2017/0220327 A1* | 8/2017 | Allen | G06F 8/427 |
| 2018/0067836 A1* | 3/2018 | Apkon | G06F 8/73 |
| 2018/0107478 A1* | 4/2018 | Codato | G06F 8/71 |
| 2019/0050319 A1* | 2/2019 | Gondalia | G06F 11/3664 |
| 2019/0146784 A1* | 5/2019 | Krauss | G06F 8/71 |
| | | | 717/122 |
| 2019/0188317 A1* | 6/2019 | Kashyap | G06N 20/00 |
| 2020/0026757 A1* | 1/2020 | Bagley, Jr. | G05B 19/0423 |
| 2020/0026870 A1* | 1/2020 | Bagley, Jr. | G06F 21/6218 |
| 2020/0097389 A1* | 3/2020 | Smith | G06F 11/0775 |
| 2020/0167134 A1* | 5/2020 | Dey | G06F 9/453 |
| 2021/0192144 A1* | 6/2021 | Paley | G06F 40/30 |

OTHER PUBLICATIONS

Haije, Tjalling, "Automatic Comment Generation Using a Neural Translation Model", Bachelor thesis, Bachelor Opleiding Kunstmatige Intelligentie, University of Amsterdam, Jun. 24, 2016, 34 pages.
Hu et al., "Deep Code Comment Generation", ICPC'18, May 27-May 28, 2018, Gothenburg, Sweden, © 2018 Association for Computing Machinery, ACM ISBN 123-4567-24-567/08/06, 11 pages.
Wang et al., "Comment Generation for Source Code: Survey", Computer and Information Sciences, University of Delaware, Newark, DE, arXiv:1802.029971v1 [cs.se] Jan. 5, 2018, 5 pages.

* cited by examiner

PREDICTIVE NATURAL LANGUAGE RULE GENERATION

BACKGROUND

The present invention relates generally to the field of predictive text generation, and more particularly to generating natural language rules utilizing transferrable neural networks.

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process it and then signal additional artificial neurons connected to it.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRUs) are a gating mechanism in recurrent neural networks. GRU performance on polyphonic music modeling and speech signal modeling was found to be similar to LSTM. However, GRUs exhibit better performance on smaller datasets.

Programmatic business rules are computational abstractions of the policies and practices of a business organization. In computer software development, the programmatic business rules approach is a development methodology where rules are in a form that is used by, but does not have to be embedded in, business process management computational systems. The programmatic business rules approach formalizes critical computational business logic in a language that managers and technologists understand. Programmatic business rules create an unambiguous statement of what a business does with information to decide a proposition.

Programmatic business rule mining is the process of extracting essential intellectual business logic in the form of programmatic business rules from packaged or legacy software applications, recasting them in natural or formal language, and storing them in a source rule repository for further analysis or forward engineering. The goal is to capture these legacy programmatic business rules in a way that the business can validate, control, and alter them over time.

SUMMARY

Embodiments of the present invention disclose a method, a computer program product, and a system for generating natural language rules based on detected code snippets. The method includes one or more computer processors detecting a code snippet. The one or more computer processors extract code information from the detected code snippet. The one or more computer processors feed the extracted code information into a cognitive model, wherein the cognitive model utilizes one or more historical code snippets based on the extracted code information and one or more natural language rules based on the extracted code information. The one or more computer processors generate, based on one or more calculations by the cognitive model, a natural language rule for the code snippet.

DETAILED DESCRIPTION

Generating natural language rules for code bases is a daunting and exceedingly complex task for many organizations. Generally, creating and implementing natural language rules involves participants from many different groups with varying levels of expertise and technical knowledge. These groups can range from developers to analysts to management. In order to generate descriptive natural language rules based off code, analysts need to work with developers to convert programming jargon into a precise rules and statements that describe, constrain, or control some aspect of the required task (e.g., a business need) in a natural language format. Some analysts are unable to understand code without assistance from developers. This issue is amplified when the code base is legacy code due to the code complexity and the scarcity of developers who can support these systems. Furthermore, many code bases are obfuscated to prevent unauthorized users from deciphering exposed source code. Unfortunately, this has the detrimental effect of preventing individuals, apart from the original developers, from understanding and comprehending the code.

Traditionally, organizations utilize natural language mining engines (e.g., business, rule miners, rational asset analyzers, operational decision mangers, etc.) to discover natural language rules (e.g., business rules, business logic, etc.) such as insurance premium calculations or medical record registrations from enterprise legacy software systems (e.g., mainframe system written in Common Business-Oriented Language (COBOL)) and code bases. Natural language rule mining is a costly and time-consuming process as legacy systems, typically, are complex and lacking documentation. Moreover, the original developers of such systems are typically unavailable for code interpretation and assistance. In many instances programming comments are available although non-developers and support staff can not readily understand the comments. Typically, code comments created by developers, without business analyst input, focus on the programmatic functionality of the code snippet. For example, a function code comment may only state the inputs the function accepts and what data type the function will output (e.g., function A accepts an array of strings and outputs a tuple) instead of a natural language rule or comment expressing in common logic terms.

Embodiments of the present invention recognize that natural language rule creation, readability, and maintenance is improved by detecting, analyzing, and generating natural language rules based on trained recurrent neural networks. In an embodiment of the present invention, natural language rules are generated on the fly as a developer codes in an Integrated Development Environment (IDE) or text editor. In another embodiment of the present invention, natural language rules are generated and applied to existing code bases, allowing an organization the ability to create documentation for previously undocumented sections of code. Implementation of embodiments of the invention may take a variety of forms, and exemplary implementation details are discussed subsequently with reference to the Figures.

The present invention will now be described in detail with reference to the Figures.

Figure 1:
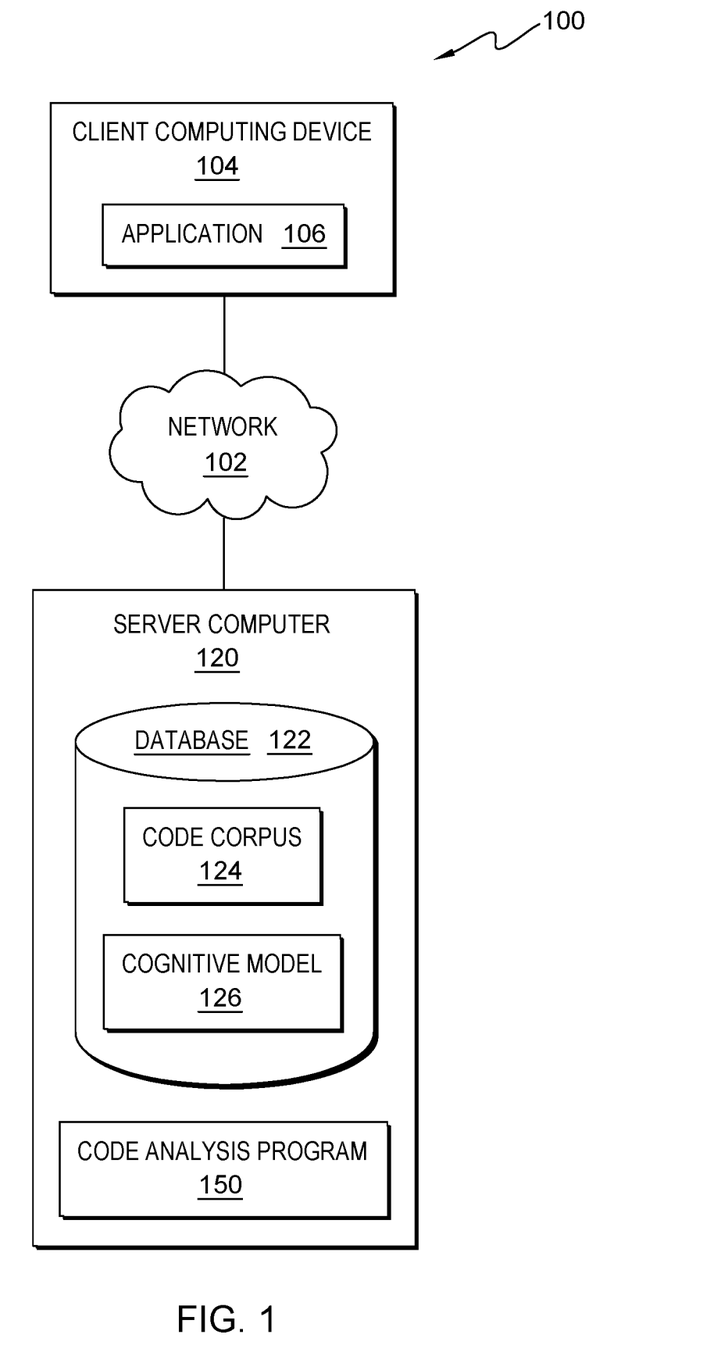
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes client computing device 104 and server computer 120, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Client computing device 104 may be a web server or any other electronic device or computing system capable of processing program instructions and receiving and sending data. In some embodiments, client computing device 104 may be a laptop computer, a tablet computer, a netbook computer, a personal computer (PC), a desktop computer, a personal digital assistant (PDA), a smart phone, or any programmable electronic device capable of communicating with network 102. In other embodiments, client computing device 104 may represent a server computing system utilizing multiple computers as a server system, such as in a cloud computing environment. In general, client computing device 104 is representative of any electronic device or combination of electronic devices capable of executing machine readable program instructions as described in greater detail with regard to FIG. 4, in accordance with embodiments of the present invention. In an embodiment, client computing device 104 contains application 106.

Application 106 is a set of one of more programs designed to carry out the operations for a specific application to assist a user to perform an activity (e.g., word processing programs, spread sheet programs, media players, web browsers, text editor, IDE, business rule miner, business rule analyzer, etc.). In the depicted embodiment, application 106 is a natural language rule mining application that resides on client computing device 104. In another embodiment, application 106 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and code analysis program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by code analysis program 150. In the depicted embodiment, database 122 resides on server computer 120. In another embodiment, database 122 may reside on client computing device 104 or elsewhere within computational environment 100 provided code analysis program 150 has access to database 122. A database is an organized collection of data. Database 122 can be implemented with any type of storage device capable of storing data and configuration files that can be accessed and utilized by code analysis program 150, such as a database server, a hard disk drive, or a flash memory. In the depicted embodiment, database 122 includes code corpus 124 and cognitive model 126.

Figure 3:
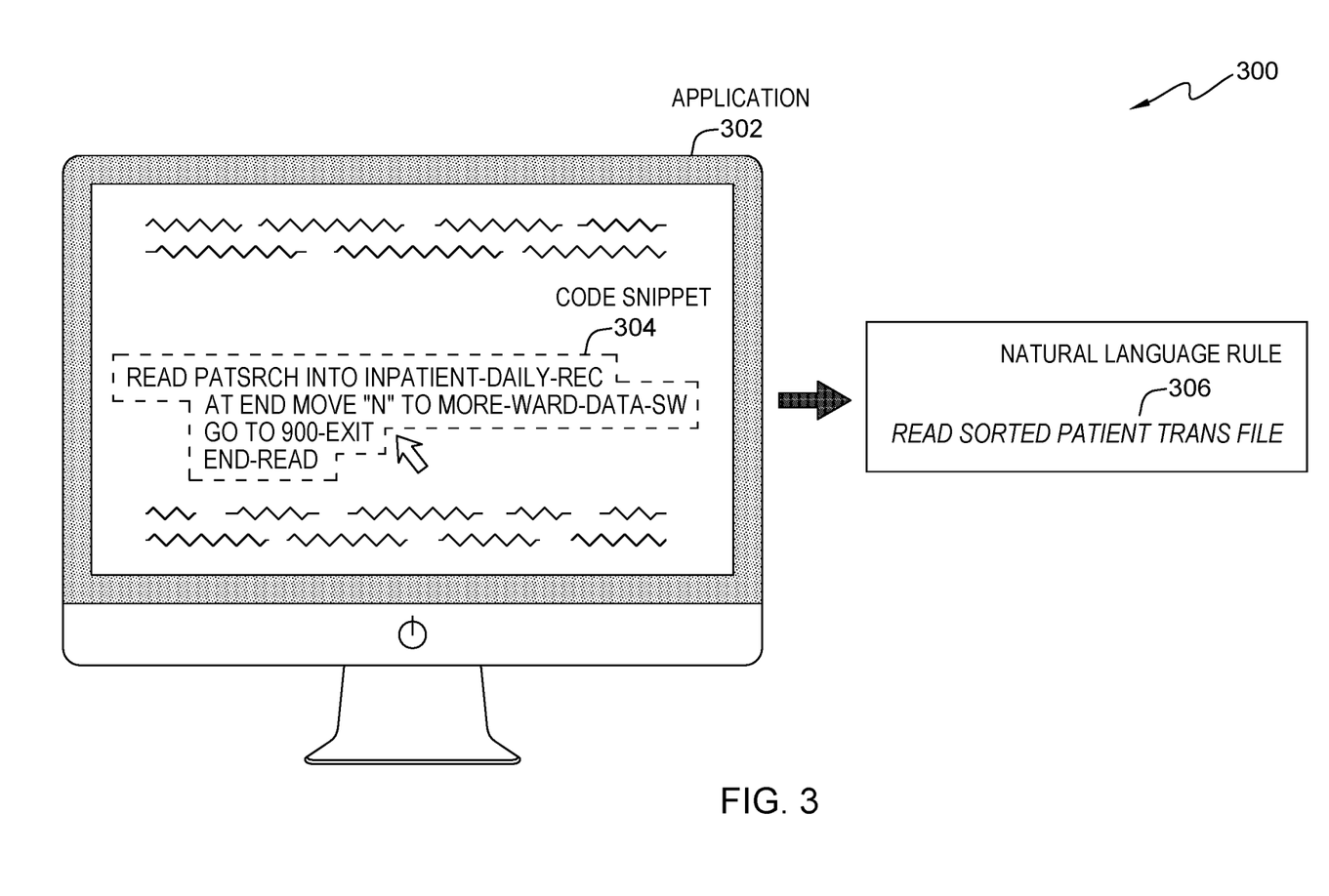
FIG. 3 depicts example code snippet 300, which is an example of a code snippet and an associated natural language rule, in accordance with an embodiment of the present invention.

Code corpus 124 may contain one or more instances of historical code snippets (i.e., small region of re-usable source code, machine code, object code, or plain text), hereinafter are referred to as snippets, and associated natural language rules (i.e., rules, operations, definitions, and constraints), hereinafter are referred to as rules. In an embodiment, natural language rules include a plurality of descriptive structures such as programmatic business rules (i.e., details the routes and the methods required by a business, corporation, or organization), programmatic business logic (i.e., determine how data can be created, stored, and changed), and programmatic natural language text blocks (i.e., sections of plain language text that details a section of code in terms of business practices). Said structures are natural language formatted, allowing non-technical users to comprehend and understand the descriptive text with additional knowledge or assistance. FIG. 3 illustrates example code snippet 300, an example instance of a stored code snippet with an associated natural language rule that is stored within code corpus 124. In various embodiments, code corpus 124 includes historical snippets and rules from the programming language of the snippet. In other embodiments, code corpus 124 includes historical snippet and rule pairs from the programming language of the snippet and other programming languages from within the language family or other syntactically similar programming languages. For example, code corpus 124 contains snippets and rules from the C language but also from C++ and C#. In the depicted embodiment, code corpus contains snippets and rules from the COBOL language in addition to similar languages such as PL\I and Fortran. In an embodiment, code corpus 124 contains unprocessed snippets.

In various embodiments, code corpus 124 includes programmatic comments, hereinafter are referred to as comments, which include a programmatic description of the code snippet. Generally, code comments include required parameters, return value/type, description that includes the intention of the programmer or developer, etc. In another embodiment, code corpus 124 may include a series of vectors containing code information corresponding to a plurality of determined features including, but not limited to, comment complexity, code complexity, code length, comment length, intermediate representation objects (e.g., bytecode, heterogeneous system architecture (HSA) layer, etc.), abstract syntax tree, etc. In yet another embodiment, code information may include preprocessed word vectors that contain a single word per dimension as illustrated in one hot encoding as described in step 204. In various embodiments, code information may include word embedded vectors that include contextual and relational data (e.g., relating to words that precede and follow a target word). In an embodiment, code information includes sets of snippets with corresponding labelled natural language rules. In another embodiment, code corpus 124 may be represented as a graph database, where the code snippets are stored in relation to associated rules forming sequences of code and rule combinations.

Cognitive model 126 utilizes deep learning techniques to generate natural language rules based on code snippets. Specifically, cognitive model 126 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised and/or unsupervised methods. In the depicted embodiment, cognitive model 126 contains a recurrent neural network (RNN) trained with supervised learning methods. In an embodiment, cognitive model 126 utilizes gated recurrent units (GRU). GRUs simplify the training process while reducing the amount of necessary computational resources. In another embodiment, cognitive model 126 utilizes LSTM. LSTM entails a more robust process, requiring more computational resources, but LSTM is more effective when training from large datasets. In various embodiments, the hidden layers of cognitive model 126 may be unidirectional or bidirectional. In an embodiment, cognitive model 126 includes multiple neural networks, each feeding into each other but accepting different training and testing sets. In a further embodiment, cognitive model 126 includes a plurality of connected transferrable neural networks that include networks that are trained utilizing historical snippet and rule pairs, historical snippet and comment pairs, and combinations of snippet, comment, and rule pairs.

Cognitive model 126 assesses a snippet by considering different features, available as structured or unstructured data, and applying relative numerical weights. Code analysis program 150 feeds a vectorized training set of feature data to cognitive model 126. In various embodiments, the data (e.g., snippets) is labeled with an associated rule enabling cognitive model 126 to learn what features are correlated to a specific rule, prior to use. In another embodiment, the data (e.g., snippets) is labeled with an associated comment. In various embodiments, the labelled data includes the programming language of the code in addition to the snippet, and an associated rule and comment. The training set includes a plurality of features including, but not limited to, tokenized snippets, tokenized comments, tokenized rules, associated functions, variables, objects, data structures, etc. Cognitive model 126 is trained to recognize the differences between programming languages and the respective programmatic conventions of the languages. Cognitive model 126 learns from the training set of data to distinguish between likely and unlikely rules based on a given snippet. Once trained, cognitive model 126 can generate natural language rules based on the data aggregated and fed by code analysis program 150. The training of cognitive model 126 is depicted and described in further detail with respect to FIG. 2.

Code analysis program 150 is a program for generating natural language rules (i.e., logic) by detecting, analyzing, extracting, and creating feature vectors from one or more code snippets. In an embodiment, code analysis program 150 may perform preprocessing techniques (e.g., removing reserved words (public, return, void, etc.), extracting contextual words, tokenizing data structures, retrieving and applying programmatic conventions, applying weights, etc.) on entire programs or smaller code snippets. In an embodiment, code analysis program 150 receives code snippets and associated metadata (associated files, functions, programmatic conventions, intermediate representation objects, etc.) from users of application 106. In another embodiment, code analysis program 150 aggregates associated code snippets with applicable data stored in database 122, thus creating code information. Applicable data may be any information or metadata that is associated with a code snippet, such as historical rules, associated feature vectors, similar code snippets based in other programming languages, associated supporting files, and code complexity. In another embodiment, code analysis program 150 utilizes supervised training to train cognitive model 126 based on the aggregated information. In an embodiment, code analysis program 150 processes and extract code information from a code snippet (i.e., a snippet that does not have an attached or labeled rule). Code analysis program 150 feeds the code information into a cognitive model (e.g., cognitive model 126) that can calculate and generate a natural language rule based on the code snippet. Code analysis program 150 logs the code snippet, generated rule, and associated information (e.g., programming language, tokenized vectors, code comments, similar natural language rules, similar business rules, etc.) into code corpus 124.

In the depicted embodiment, code analysis program 150 resides on server computer 120. In another embodiment, code analysis program 150 may reside on client computing device 104. In another embodiment, code analysis program 150 includes an instance of cognitive model 126. Code analysis program 150 is depicted and described in further detail with respect to FIG. 2.

Figure 2:
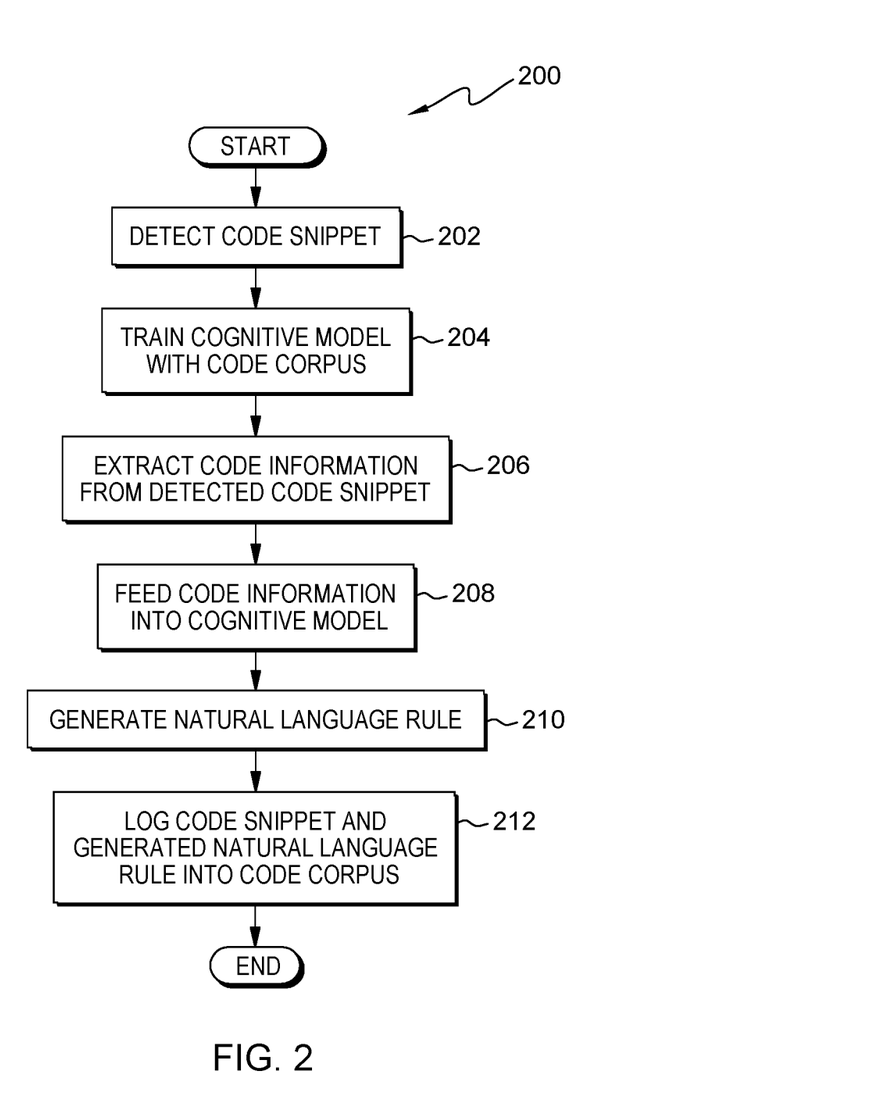
FIG. 2 is a flowchart depicting operational steps of a code analysis program, on a server computer within the computational environment of FIG. 1, for generating natural language rules based on detected code snippets, in accordance with an embodiment of the present invention.

FIG. 2 is a flowchart depicting operational steps of code analysis program 150 for generating natural language rules based on code snippets, in accordance with an embodiment of the present invention.

In an embodiment, code analysis program 150 prompts a user associated with client computing device 104 to determine whether the user grants code analysis program 150 access to source directory files and file contents. In another embodiments, code analysis program 150 prompts a user associated with application 106 to determine whether the user grants code analysis program 150 access to the clipboard functionality associated with application 106 and/or to monitor the user input (e.g. keyboard inputs and strokes, etc.) within application 106. For example, a developer highlights a section of code within an IDE, code analysis program 150 detects and stores the highlighted portion of the code. In a further example, code analysis program 150 stores the file containing the highlighted code and any associated files.

Code analysis program 150 detects a code snippet (step 202). In an embodiment, code analysis program 150 detects a snippet by detecting the user entering words in an IDE (e.g., application 106). In a further embodiment, code analysis program 150 may trigger code analysis in response to every character, line, or sentence the user inputs. In an alternative embodiment, code analysis program 150 may trigger code analysis after the user stops inputting for a specified duration. For example, the user begins to input a section of code and after five seconds of non-input, code analysis program 150 determines the code section is ready to be analyzed. In various embodiments, code analysis program 150, accepts a user inputted code snippet. In yet another embodiment, code analysis program 150 utilizes the highlighted selection of the user as a code snippet. For example, as a developer is scrolling through a section of source code, the developer highlights a function which program 150 detects and identifies as a snippet.

Code analysis program 150 determines the programming language of the detected code snippet. In an embodiment, code analysis program 150 extracts the file extension from the parent source file to determine the programming language of the contained snippet. For example, if a source file has an example file extension of ".php" then code analysis program 150 determines any conforming snippets found within are PHP: Hypertext Preprocessor (PHP). In yet another embodiment, code analysis program 150 extracts and analyzes the metadata associated with the snippet and the source file to determine the utilized programming language. In various embodiments, code analysis program 150 analyzes associated files contained with the workspace of the snippet to aid in determining a programming language. For example, if code analysis program 150 detects ".h" files within the workspace, folder or linked to the source file or snippet, then code analysis program 150 determines that the programming language utilized is either C, C++, or Objective-C.

In an embodiment, code analysis program 150 compares the programmatic conventions (e.g., function names, variable names, available data structures, system functions, etc.) of the detected snippet with historical snippets. In this embodiment, code analysis program 150 generates a relevancy score based on the determined similarities and differences of the code snippets. In an embodiment, the relevancy score is a numerical value, or a percentage based on the degree of similarity between the detected code and the conventions of various programming languages. In this embodiment, the higher the relevancy score, the greater degree of programmatic similarities between snippets. Through said relevancy score, code analysis program 150 determines the programming language of the detected snippet. In another embodiment, code analysis program 150 identifies specific functions or commands in a code snippet that are solely available in a specific programming language. For example, if code analysis program 150 identifies a malloc command, then code analysis program 150 determines the programming language as C or as a C variant. In an embodiment, the user specifies the programming language of the snippet. In various embodiments, code analysis program 150 prompts the user to input the programming language of the snippet and/or the source file.

In an embodiment, responsive to detecting and identifying a programming language for a code snippet, code analysis program 150 retrieves a code corpus, such as code corpus 124, specific to the identified programming language. In an alternative embodiment, if code corpus 124 does not include code information (e.g., coding conventions, code snippet/rule/comment pairs, etc.) specific to the identified code snippet programming language, then code analysis program 150 retrieves said code information from a plurality of sources, such as a publicly available external source, and stores said information within code corpus 124.

In various embodiments, code analysis 150 identifies, retrieves, and stores similar programming languages. In this embodiment, code analysis program 150 utilizes a plurality of known NLP techniques (e.g., bag-of-words, n-gram modeling, etc.) to identify similar or related programming languages. In another embodiment, code analysis program 150 utilizes the NLP techniques to calculate a similarity score, comparable to the relevancy score discussed above, between the identified programming language and other traditionally similar programming languages. In an embodiment, the similarity score is a numerical value or a percentage. In this embodiment, the larger the similarity score, the greater degree of programmatic similarities between the compared programming languages. In another embodiment, code analysis program 150 stores similar programming language code snippets, rule, and comment pairs within code corpus 124, alongside the coding conventions, code snippets, and associated rules and comments of the detected code snippet. For example, if code analysis program 150 detects and determines that the snippet is written in Python then code analysis program 150 calculates a similarity score for traditionally similar programming languages such as Ruby, Perl, and JavaScript. In this example, if the similarity score is above a predetermined threshold, then code analysis program 150 includes the similar language(s) in code corpus 124.

Code analysis program 150 trains cognitive model with a code corpus (step 204). In an embodiment, code analysis program 150 trains cognitive model 126 with a plurality of feature vectors originating from code information extracted from the programming language specific historical snippets and associated rules located in code corpus 124. In a further embodiment, the code information included associated comments. In this embodiment, rules training sets are given higher weights than comment training set. In another embodiment, code analysis program 150 retrieves all historical snippets and associated historical rules with a determined programing language. In various embodiments, code analysis program 150 retrieves a subset of historical snippets, associated rules, and comments, such as, historical snippets created within a defined time period or historical snippets that are based on a similar programming language (e.g., JavaScript and TypeScript, C++ and C#, etc.). In an embodiment, code analysis program 150 extracts code information from the snippet contents such as code lines, language conventions, and data structures (e.g., variables, arrays, lists, stacks, queues, heaps, matrices, etc.). In a further embodiment, additional code information includes but is not limited to, code complexity (e.g., amount of lines, imported modules, etc.), intermediate representation objects, identified programming language, related programming languages, and associated programmatic conventions.

Code analysis program 150 then parses the extracted code information based on program-dependent parsers specific to the identified programming language. In an embodiment, code analysis program 150 removes system specific reserve words such as 'public', 'return', and 'static' in Java and 'self', 'type', and 'write-only' in COBOL. This removes numerous features that would not be useful nor descriptive when generating comments. In another embodiment, code analysis program 150 utilizes term (e.g., a word) frequency-inverse document frequency (tf-idf) techniques to calculate how important a term is to the comment. In another embodiment, code analysis program 150 utilizes tf-idf to calculate a series of numerical weights for the terms extracted from historical code snippets. In a further embodiment, code analysis program 150 utilizes said calculations to identify and weigh frequently used terms. For example, code analysis program 150 increases the weight of a word proportionally to the frequency the word appears in the code snippets and comments offset by the frequency of other code snippets and comments, in code corpus 124, that contain the term. Low tf-idf valued terms can be safely removed in order to decrease the amount of features utilized. In another embodiment, code analysis program 150 removes punctuation (e.g., commas, periods, etc.) and reduces all letters to lowercase from code snippets, rules, and comments in order to reduce the number of dimensions.

Code analysis program 150 then tokenizes the code information after the extraction and preprocessing detailed above. The tokenization process may be programming language dependent, where different languages have different conventions that may impact accuracy of the comment generation. For example, python conventions dictate that variable names should be in lowercase with spaces represented as underscores (e.g., patient_id or client_name). In another example, COBOL conventions dictate that variables name should be all capitalized with a dash representing spaces (e.g., PATIENT-ID or CLIENT-NAME). In an embodiment, code analysis program 150 may utilize an abbreviation database to expand acronyms such as the term "DB" which can be expanded as "database". For example, once tokenized the variable name "patient_id" would become the vector [patient, identification]. In another example, a code snippet is preprocessed and tokenized into the array [void, validate, positive, numeric, value, string, if, string, utils, is, empty, numeric] and the associated comment is tokenized into the array [check, if, string, represents, positive, numeric, value, parameter, numeric, value, string].

In an embodiment, code analysis program 150 utilizes natural language processing (NLP) techniques such as syntactic analysis to identify parts of speech and syntactic relations between various portions of a rule and/or comment. In a further embodiment, code analysis program 150 utilizes part-of-speech tagging to identify the part of speech of one or more words in a rule and/or comment based on its relationship with adjacent and related words. For example, code analysis program 150 utilizes the aforementioned techniques to identify the nouns, adjectives, adverbs, and verbs in the example comment: "Creates an object composed of keys generated from the results of running each element of the collection thru the iteration function" In this example, code analysis program 150 identifies "object", "keys", "results", "elements", and "collection" as nouns, and "create", "generated", and "running" as verbs. In an embodiment, code analysis program 150 creates sets of identified terms and associates these terms with other terms that appear sequentially.

Code analysis program 150 can process the retrieved historical snippets and associated rules into multiple training and testing sets. In an embodiment, code analysis program 150 partitions historical snippets into discrete sets containing differently processed versions of the same snippet. In another embodiment, code analysis program 150 defines the bounds of a snippet by utilizing predetermined criteria. For example, code analysis 150 may focus on snippets that are encapsulated in discrete functions. In yet another embodiment, code analysis program 150 defines a snippet by identifying the scope of the associated comment and segmenting the historical snippets into discrete subject sets. For example, a snippet may be a function that contains multiple requests to other functions, then code analysis program 150 may identify each function and partition the functions and the associated rules into distinct code snippet and rule pairs.

Code analysis program 150 can process each snippet and rule pair based on a determined feature set and/or determined code snippet scopes. For example, if the feature set is based on rule complexity, then code analysis program 150 transforms each word in a selected rule into a corresponding stem/root equivalent. In yet another embodiment, code analysis program 150 non-deterministically divides the processed sets into training sets and into test sets. In a further embodiment, code analysis program 150 attaches the corresponding rule to each snippet as a label.

Code analysis program 150 can vectorize the partitioned snippet and rule sets. In an embodiment, code analysis program 150 utilizes one-hot encoding techniques to vectorize categorical or string-based feature sets. For example, when vectorizing feature sets of individual words, code analysis program 150 creates a one-hot vector comprising a 1×N matrix, where N symbolizes the number of distinguishable words. In another embodiment, code analysis program 150 utilizes one hot encoding to recode categorical data into a vectorized form. For example, when vectorizing an example word feature set consisting of [positive, numerical, string], code analysis program 150 encodes the corresponding feature set into [[1,0,0], [0,1,0], [0,0,1]]. In another embodiment, code analysis program 150 utilizes featuring scaling techniques (e.g., rescaling, mean normalization, etc.) to vectorize and normalize numerical feature sets. In various embodiments, code analysis program 150 utilizes word embedding techniques such as word2vec or doc2vec to produce vectors which denote similarities between words that share common contexts. Word embedding techniques create word-based vectors, similar to one hot encoding, although, word embedding creates vectors that are structured so that similar words are positioned in close proximity to each other in the vector space. Another distinction between one hot encoding and word embedding is that word embedding allows for a vector space dimension to include multiple words while one hot encoding creates vector spaces with one dimension per word. For example, the sentence "the quick brown fox jumps over the lazy dog" and specifically the word fox could be word embedded as the vector [0,0,1,1,1,0,0,0], encompassing the word "fox" along with "brown" and "jumps". Word embedding vectors reduce the number of dimensions thus increasing the training speed of the model and reducing system memory requirements.

Code analysis program 150 can train cognitive model 126 by feeding the processed vectors into cognitive model 126. In an embodiment, code analysis program 150 initializes cognitive model 126 with randomly generated weights. In an alternative embodiment, code analysis program 150 initializes cognitive model 126 with weights calculated from the analysis described above in step 204 (e.g., tf-idf, etc.). In the depicted embodiment, cognitive model 126 is represented as a recurrent neural network. In alternative embodiments, cognitive model 126 may be represented as a simple neural network or a specialized neural network such as Markov chains, perceptron, deep feed forward (DFF), Boltzmann machine, support vector machine (SVM), neural Turing machine, etc.

In various embodiments, code analysis program 150 determines which variation of a recurrent neural network to utilize. In a further embodiment, code analysis program 150 utilizes LSTM or GRU. In this embodiment, code analysis program 150 determines which variation of neural network to use based on the size of the corpus and training data. For example, for larger sets of training sets LSTM is utilized and, contrastingly, for smaller sets GRU is utilized. In another embodiment, code analysis program 150 may utilize unidirectional or bidirectional hidden layers. Bidirectional hidden layers connect hidden layers of opposite directions to the same output allowing for the output layer to receive information from past and future states simultaneously. Bidirectional hidden layers allow for the context of an input (e.g., a word) to be considered along with the input. Unidirectional hidden layers only pass information to future states, therefore, unidirectional hidden layers allow for less contextual information available to the output layer.

In an embodiment, code analysis program 150 maintains several variations of neural networks in order to determine which variation of neural network to utilize. In this embodiment, responsive to code analysis program 150 training each variation, code analysis program 150 calculates and stores the performance and accuracy parameters of each respective neural network. From said parameters, code analysis program 150 can determine which neural network variation best encompasses (e.g., performance, accuracy, memory requirements, etc.) the training data. In another embodiment, if code analysis program 150 determines that system resources are sufficient, then code analysis program 150 may maintain several variations of recurrent neural networks training in parallel.

Code analysis program 150 can utilize processed training sets to perform supervised training of cognitive model 126. As would be recognized by one skilled in the art, supervised training determines the difference between a prediction and a target (i.e., the error), and back-propagates the difference through the layers such that cognitive model 126 "learns". In an embodiment, code analysis program 150 determines whether a sufficient accuracy is obtained by utilizing test sets. In another embodiment, code analysis program 150 utilizes cross-entropy loss as a loss function to determine the level of accuracy of the model. In this embodiment, code analysis program 150 compares the predicted sequence (e.g., the generated rule) with the expected sequence (e.g. the historical rule or comment). In yet another embodiment, code analysis program 150 may utilize the cross-entropy loss value to calculate a word error rate which further denotes the level of accuracy per word in a generated rule. In this embodiment, code analysis program 150 determines sufficient accuracy based on the word error rate generated by cognitive model 126. If the calculated accuracy is insufficient, then code analysis program 150 continues with supervised training of cognitive model 126. If the calculated accuracy is sufficient, then code analysis program 150 ends the training process.

Code analysis program 150 extracts code information from detected code snippet (step 206). In an embodiment, code analysis program 150 retrieves the detected snippet either as an unprocessed snippet or as a processed vector as detailed in step 204. In this embodiment, the vector may include a separate dimension per word, or the vector may be word embedded to include multiple words and associated contexts per dimension. If code analysis program 150 receives an unprocessed code snippet, then code analysis program 150 may extract, preprocess, and vectorize the words identified in the code snippet with the steps and techniques described in step 204. In this embodiment, code analysis program 150 calculates and processes the code information (i.e., processed and unprocessed word vectors, rule complexity, code complexity, code length, rule length, vectorized rules, and vectorized snippets, etc.) of the snippet. In another embodiment, the code information includes comment information such as comment complexity, comment length, processed and vectorized comments.

Code analysis program 150 feeds code information into cognitive model (step 208). In an embodiment, code analysis program 150 feeds the extracted word vectors and code information (from step 206) into cognitive model 126. Cognitive model 126 processes the extracted code information to evaluate the snippet. Cognitive model 126 assesses the word vectors and code information by utilizing the training set of labelled snippet and rule pairs (e.g. code corpus 124) as described in step 204, to assign weights to the various components. Responsive to said training, code analysis program 150 can utilize cognitive model 126, and the learned weights of the model, to generate a sequence of words that probabilistically represent a comment based on the snippet.

Code analysis program 150 generates natural language rules (step 210). Code analysis program 150 utilizes the trained model and the learned weights and layers of the model to predict and generate the next word in a sequence (e.g., sentence) given one or more words. In one embodiment, utilizing the output of cognitive model 126, code analysis program 150 generates a series of words and associated probabilities. Said probabilities denote the chance that the predicted word is the next word in a sequence. In an embodiment, code analysis program 150 selects the most probable word (e.g., the word with the highest attached probability). In another embodiment, code analysis program 150 prompts the user with the top predicted words and allows the user to select the next word. In a further embodiment, code analysis program 150 prompts the user if no predicted word meets or exceeds a predetermined probability threshold. For example, if the probability threshold is set at 50% and no predicted words have a probability greater than or equal to 50%, then code analysis program 150 prompts the user with the list of predicted words. In another embodiment, responsive to the prediction and generation of a word, code analysis program 150 appends the generated word to the end of the sequence and feeds the new sequence into cognitive model 126 for the prediction and generation of consecutive words. In various embodiments, code analysis program 150 halts feeding sequences into cognitive model 126 if the predicted probability of all the words falls under a predetermined probability threshold level such as 50%.

Code analysis program 150 logs code snippet and the generated rule into code corpus (step 212). In one embodiment, code analysis program 150 logs the snippet and the generated rule into code corpus 124. In another embodiment, code analysis program 150 may receive user feedback through a graphical user interface on client computing device 104 (not depicted). For example, after code analysis program 150 analyzes a snippet, the user can provide feedback for the snippet and the generated rule on a user interface. In various embodiments, feedback may include a simple positive or negative response. In another embodiment, feedback may include a user confirmation or score of the generated rule. For example, if code analysis program 150 generates an incorrect rule, the user can provide negative feedback and provide an accurate rule. In an embodiment, code analysis program 150 adds the user feedback and the corrected rule to code corpus 124, allowing code analysis program 150 to adjust the cognitive model. In another embodiment, code analysis program 150 may use one or more techniques of NLP to determine whether the response of the user is positive or negative.

In various embodiments, code analysis program 150 retrains cognitive model 126 with code corpus 124 along with the detected snippet and the generated rule. In this embodiment, code analysis program 150 determines the precision level of the retrained cognitive model 126. If code analysis program 150 determines that the precision level has increased, then code analysis program 150 stores the retrained cognitive model and logs the detected snippet and generated rule into code corpus 124. If code analysis program 150 determines that the precision level has decreased, then code analysis program 150 adjusts the weights of the features and retrains the cognitive model in order to generate a more probable rule. Responsive to the retraining, code analysis program 150 feeds the extracted code information, as detailed in step 206, into the retrained cognitive model generating another natural language rule.

FIG. 3 depicts example code snippet 300, which is an example illustration of a code snippet and a natural language rule generated by cognitive model 126. Example code snippet 300 includes application 302, which may be an IDE or natural language rule mining engine. Application 302 includes code snippet 304 illustrating a user highlighting or selecting a portion of COBOL code. Example code snippet 300 also includes natural language rule 306. Natural language rule 306 is an example of a natural language rule that cognitive model 126 generated from the code detected within the highlight of the user in code snippet 304.

In a detailed example of flowchart 200, analyst Marte (hereinafter Marte) is reviewing a company beta software contained within application 302 (e.g., IDE). The beta software involves analyzing and modifying medical data. As Marte reviews the software code, Marte encounters code snippet 304, which is a snippet that is unclear and improperly commented, creating user confusion regarding to which natural language rule (e.g., business rule, etc.) the code is attempting to implement. Marte highlights code snippet 304, initiating program 150. Program 150 determines the programming language of highlighted code snippet 304 as COBOL. Program 150 retrieves one or more historical COBOL code snippets along with associated COBOL natural language rules from code corpus 124. Program 150 utilizes the retrieved historical COBOL snippets and rules to train cognitive model 126 (e.g., recurrent neural network, etc.). As program 150 trains cognitive model 126, program 150 extracts code information (e.g., word embedded vectors, etc.) from code snippet 304 and processes/vectorizes the extracted information. After cognitive model 126 is trained, program 150 feeds the extracted code information into cognitive model 126, allowing the model to calculate and generate natural language rule 306 associated with code snippet 304. Program 150 then logs code snippet 304 and the generated natural language rule 306 into code corpus 124 for future training.

Figure 4:
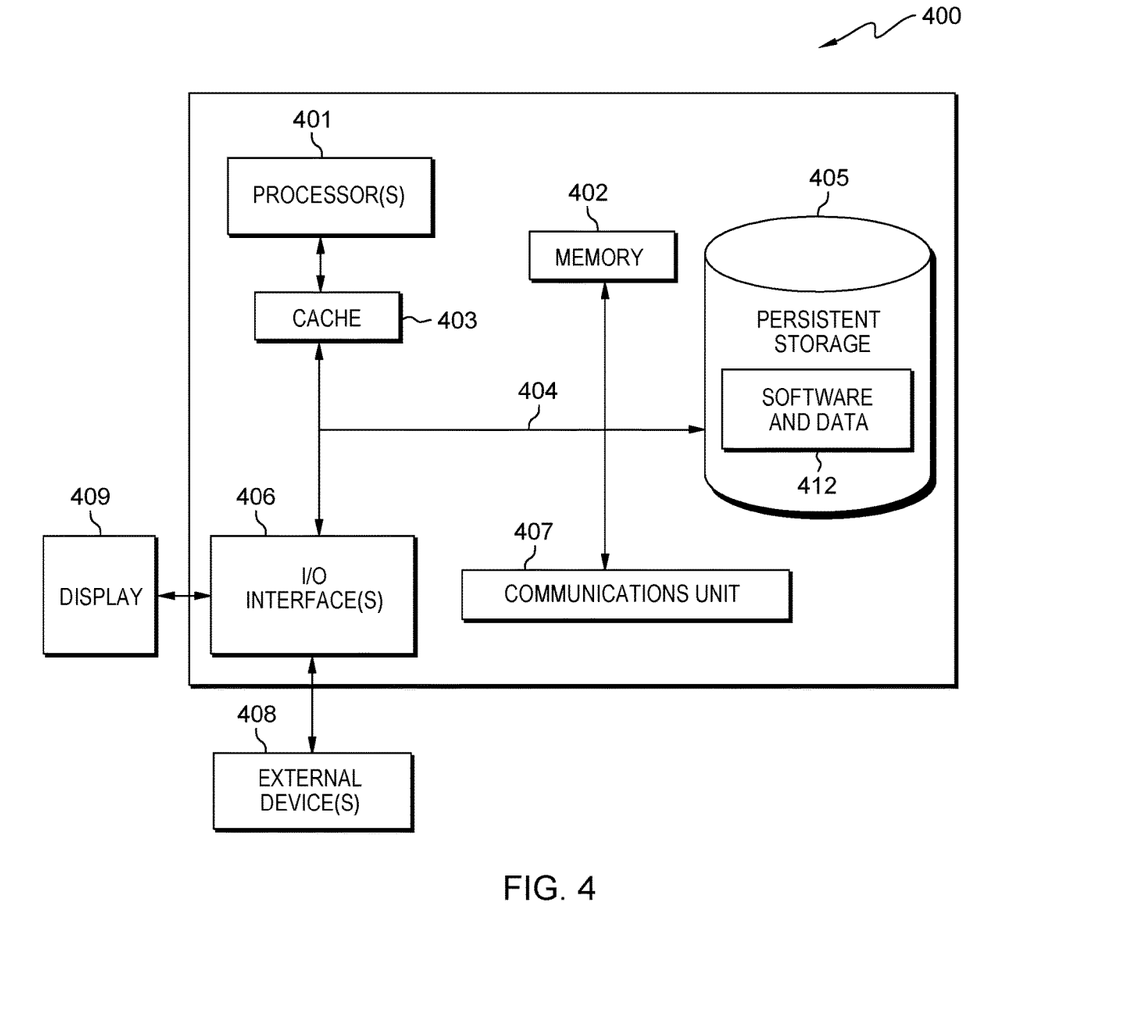
FIG. 4 is a block diagram of components of the server computer executing the code analysis program, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Code analysis program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Code analysis program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   responsive to a user inputting a code snippet into an integrated development environment, extracting, by one or more computer processors, code information from the code snippet;
   determining, by one or more computer processors, a programing language associated with the code snippet based on the extracted code information, wherein determining the programming language comprises generating a relevancy score based on the code snippet and one or more programming languages each associated with one or more conventions;
   retrieving, by one or more computer processors, a code corpus specific to the determined programing language;
   training, by one or more computer processors, a cognitive model utilizing the retrieved code corpus;
   feeding, by one or more computer processors, the extracted code information into the cognitive model, wherein the cognitive model utilizes one or more historical code snippets based on the extracted code information and one or more natural language rules based on the extracted code information; and
   generating, by one or more computer processors, based on one or more calculations by the cognitive model, a natural language rule for the code snippet, wherein generating the natural language rule comprises:
   responsive to a generated natural language word not exceeding a predetermined probability threshold, prompting, by one or more computer processors, a user for a selection from a list of predicted words with respective calculated probabilities; and
   responsive to a user selection from the list of predicted words, appending, by one or more computer processors, the selection to the natural language rule.

2. The method of claim 1, further comprises:
   creating, by one or more computer processors, one or more training sets based on the retrieved historical code snippets and associated natural language rules;
   creating, by one or more computer processors, one or more testing sets based on the retrieved historical code snippets and associated natural language rules; and
   training, by one or more computer processors, the cognitive model utilizing one or more supervised training methods, wherein the supervised training methods utilize the one or more created training sets and testing sets.

3. The method of claim 2, wherein training of the cognitive model utilizing the one or more supervised training methods, wherein the supervised training methods utilize the one or more created training sets and testing sets, further comprises:
   retrieving, by one or more computer processors, one or more programmatic comments associated with the one or more retrieved historical code snippets; and
   training, by one or more compute processors, the cognitive model utilizing one or more supervised training methods utilizing the retrieved historical code snippets, associated natural language rules, and associated programmatic comments.

4. The method of claim 1, wherein the code information is selected from the group consisting of: natural language rule complexity, code complexity, code length, natural language rule length, intermediate representation objects, abstract syntax trees, word embedded code snippet vectors, and word embedded natural language rule vectors.

5. The method of claim 1, further comprises:
   identifying, by one or more computer processors, a user selected portion of code; and
   extracting, by one or more computer processors, the code contained with the selected portion.

6. The method of claim 1, further comprises:
   retraining, by one or more computer processors, the cognitive model based on the detected code snippet and the generated natural language rule;
   determining, by one or more computer processors, a precision of the cognitive model; and
   responsive to determining that the precision of the cognitive model increased, storing, by one or more computer processors, the detected code snippet and the generated natural language rule.

7. The method of claim 1, further comprises:
   retraining, by one or more computer processors, the cognitive model based on the detected code snippet and the generated natural language rule;
   determining, by one or more computer processors, a precision of the cognitive model; and responsive to determining that the precision of the cognitive model decreased, adjusting, by one or more computer processors, one or more weights of the cognitive model.

8. The method of claim 1, wherein the cognitive model is a recurrent neural network.

9. The method of claim 8, wherein the recurrent neural network includes long short term memory.

10. The method of claim 8, wherein the recurrent neural network includes gated recurrent units.

11. The method of claim 1, wherein the natural language rule is selected from the group consisting of: business rules and business logic.

12. A computer program product comprising:
one or more computer readable storage media and program instructions stored on the one or more computer readable storage media, the program instructions comprising:
program instructions to detect a code snippet;
program instructions to extract code information from the detected code snippet;
program instructions to feed the extracted code information into a cognitive model, wherein the cognitive model utilizes one or more historical code snippets based on the extracted code information and one or more natural language rules based on the extracted code information; and
program instructions to generate, based on one or more calculations by the cognitive model, a natural language rule for the code snippet, wherein program instructions to generate the natural language rule comprise:
program instructions to responsive to a generated natural language word not exceeding a predetermined probability threshold, prompt a user for a selection from a list of predicted words with respective calculated probabilities; and
program instructions to responsive to a user selection from the list of predicted words, append the selection to the natural language rule.

13. The computer program product of claim 12, further comprises:
program instructions to create one or more training sets based on the retrieved historical code snippets and associated natural language rules;
program instructions to create one or more testing sets based on the retrieved historical code snippets and associated natural language rules; and
program instructions to train the cognitive model utilizing one or more supervised training methods, wherein the supervised training methods utilize the one or more created training sets and testing sets.

14. The computer program product of claim 13, wherein training of the cognitive model utilizing the one or more supervised training methods, wherein the supervised training methods utilize the one or more created training sets and testing sets, further comprises:
program instructions to retrieve one or more programmatic comments associated with the one or more retrieved historical code snippets; and
program instructions to train the cognitive model utilizing one or more supervised training methods utilizing the retrieved historical code snippets, associated natural language rules, and associated programmatic comments.

15. The computer program product of claim 12, wherein the code information is selected from the group consisting of: natural language rule complexity, code complexity, code length, natural language rule length, intermediate representation objects, abstract syntax trees, word embedded code snippet vectors, and word embedded natural language rule vectors.

16. The computer program product of claim 12, wherein the cognitive model is a recurrent neural network.

17. A computer system comprising:
one or more computer processors;
one or more computer readable storage media; and
program instructions stored on the computer readable storage media for execution by at least one of the one or more processors, the program instructions comprising:
program instructions to detect a code snippet;
program instructions to extract code information from the detected code snippet;
program instructions to feed the extracted code information into a cognitive model, wherein the cognitive model utilizes one or more historical code snippets based on the extracted code information and one or more natural language rules based on the extracted code information; and
program instructions to generate, based on one or more calculations by the cognitive model, a natural language rule for the code snippet, wherein program instructions to generate the natural language rule comprise:
program instructions to responsive to a generated natural language word not exceeding a predetermined probability threshold, prompt a user for a selection from a list of predicted words with respective calculated probabilities; and
program instructions to responsive to a user selection from the list of predicted words, append the selection to the natural language rule.

18. The computer system of claim 17, further comprises:
program instructions to create one or more training sets based on the retrieved historical code snippets and associated natural language rules;
program instructions to create one or more testing sets based on the retrieved historical code snippets and associated natural language rules; and
program instructions to train the cognitive model utilizing one or more supervised training methods, wherein the supervised training methods utilize the one or more created training sets and testing sets.

19. The computer system of claim 18, wherein training of the cognitive model utilizing the one or more supervised training methods, wherein the supervised training methods utilize the one or more created training sets and testing sets, further comprises:
program instructions to retrieve one or more programmatic comments associated with the one or more retrieved historical code snippets; and
program instructions to train the cognitive model utilizing one or more supervised training methods utilizing the retrieved historical code snippets, associated natural language rules, and associated programmatic comments.

20. The computer system of claim 17, wherein the code information is selected from the group consisting of: natural language rule complexity, code complexity, code length, natural language rule length, intermediate representation objects, abstract syntax trees, word embedded code snippet vectors, and word embedded natural language rule vectors.

* * * * *